United States Patent
Hakvoort et al.

(10) Patent No.: US 6,449,561 B1
(45) Date of Patent: Sep. 10, 2002

(54) INDUCTION LOGGING

(75) Inventors: Richard Gerrit Hakvoort; Melis van der Horst, both of Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/532,673

(22) Filed: Mar. 21, 2000

(30) Foreign Application Priority Data

Mar. 26, 1999 (EP) ............................................. 99302350

(51) Int. Cl.$^7$ ................................................. G01V 3/18
(52) U.S. Cl. ............................ 702/7; 324/339; 324/345
(58) Field of Search ................................. 324/338, 339, 324/345; 702/7, 11, 12; 703/10

(56) References Cited

U.S. PATENT DOCUMENTS

| | | | |
|---|---|---|---|
| 3,706,025 A | | 12/1972 | Regat |
| 5,142,472 A | * | 8/1992 | Day ............................ 364/422 |

OTHER PUBLICATIONS

W.C. Chew et al: "Inversion of Induction Tool Measurments Using the Distorted Born Iterative Method and CG-FFHT", *IEEE Transactions on Geoscience and Remote Sensing*, vol. 32, No. 4, Jul. 1, 1994, pp 878–884.

H.G. Doll, "Introduction to Induction Logging and Application to Logging of Wells Drilled with Oil Base Mud". Petroleum Transactions, AIME, Jun. 1, 1949, pp 148–162.

M. Huang et al, "Computation of Induction Logs in Multiple–Layer Dipping Formation", IEEE Transactions on Geoscience and Remote Sensing, vol. 27, No. 3, May 1, 1989, pp 259–267.

Foreign Search Report dated Oct. 20, 2000.

J.R. Wait, "General Formulation of the Induction Logging Problem for Concentric Layers about the Borehole," *IEEE Tranactions on Geoscience and Remote Sensing*, vol. GE–22, No. 1, Jan. 1984, pp. 34–42.

R.H. Hardman and L.C. Shen, "Theory of Induction Sonde in Dipping Beds," *Geophysics*, vol. 51, No. 3, Mar. 1986, pp. 800–809.

S. Gianzero and S–M Su, "The Response of an Induction Dipmeter and Standard Induction Tools to Dipping Beds," *Geophysics*, vol. 55, No. 9, Sep. 1990, pp. 1128–1140.

* cited by examiner

*Primary Examiner*—Edward Lefkowitz
*Assistant Examiner*—Anthony Gutierrez

(57) ABSTRACT

A method of providing a computed induction log of an induction logging tool run through an interval of a wellbore that extends through a layered formation invaded by wellbore fluid. The method comprises computing a first response of the induction logging tool by solving for each formation layer the Maxwell equations for the electromagnetic field using a one-dimensional concentric cylinder model not taking into account the effects of formation layering and of the orientation of the logging tool with respect to the formation layering, and determining for each formation layer an equivalent resistivity that gives for a homogeneous environment a response of the induction logging tool that equals the first response; and solving for a number of logging points the Maxwell equations using a one-dimensional layered model using the equivalent resistivities as computed in step wherein the effects of the formation layering and of the orientation of the logging tool with respect to the formation layering are taken into account, to provide the computed induction log of the induction logging tool.

11 Claims, 3 Drawing Sheets

INDUCTION LOGGING

FIELD OF THE INVENTION

The present invention relates to induction logging, and more in particular to a method of providing a computed induction log. For the sake of completeness it is observed that the computed induction log is sometimes called the approximate computed response.

BACKGROUND OF THE INVENTION

Induction logging is a technique to determine the true resistivity of an underground formation, it is a species of resistivity logging. With the aid of the true resistivity the water and oil saturation of the formation can be assessed and that information is valuable to the exploitation of the underground formation.

In induction logging an induction logging tool is used that comprises a transmitter coil and a receiver coil arranged axially spaced apart on a mandrel. During normal operation the induction logging tool is positioned at a logging point in a wellbore in the underground formation, and the transmitter coil is energized by an alternating current. The alternating current produces an oscillating magnetic field and that results in currents induced in the formation. These currents, in turn, generate a secondary magnetic field that contributes to the voltage induced in the receiver coil.

In one embodiment of induction logging, the component of the induced voltage that is in phase with the transmitter current is selected to obtain a signal that is approximately inverse proportional to the formation resistivity. This signal is called the apparent or measured induction log. This technique is applicable to a wireline induction logging tool, wherein the alternating current has a relatively low frequency (in the kHz range) and wherein the coils are arranged on a non-conductive mandrel.

In addition to wireline logging, it is possible to measure the formation resistivity during drilling. In this case, the mandrel is conductive and the alternating current has a high frequency (in the MHz range). In this embodiment, the induction logging tool measures the strength of the secondary magnetic field at two receiver positions. From the data measured at the two positions, the amplitude ratio and the phase shift are calculated. From the amplitude ratio and the phase shift the apparent formation resistivity is calculated.

In the specification and in the claims the expression "induction log" will not only be used to refer to the signal obtained for one logging point, but also to refer to the signals obtained for several logging points and to a continuously sampled record of the signals obtained when the induction logging tool is passed through an interval of the wellbore.

The apparent or measured induction log is in general not a log that is representative of the true formation resistivity alone. This is because there are environmental effects that affect the induction log. The formation is layered so that there are so-called shoulder bed effects, wherein the log at a logging point is influenced by the presence of formation layers above and below the formation layer opposite the logging point. In addition, the induction logging tool is positioned in a wellbore filled with a wellbore fluid, for example a drilling mud, which contributes to the apparent or measured resistivity. Moreover, wellbore fluid will invade the formation layer, and this wellbore fluid or mud filtrate forms an invaded zone near the wellbore. The resistivity of the invaded zone differs from the true formation resistivity, and this is a further reason why the apparent resistivity differs from the true formation resistivity. In conclusion, the true formation resistivity cannot be obtained directly from the apparent or measured induction log.

In order to compensate for the environmental effects, inverse well logging is applied, wherein the true formation resistivity that is not accessible by direct measurement is judged from indirect evidence. Inverse well logging requires iteratively forward modeling. To do that, a modelled resistivity profile, which is a model of the formation and the wellbore positioned therein, is made. With that model and with the known properties of the induction logging tool the Maxwell equations for the electromagnetic field are solved. This gives a computed induction log, which is then compared to the measured induction log. When the computed induction log does not match the measured one, the model is adjusted, and a new induction log is computed. Adjusting the model continues until the match is obtained. The true formation resistivity is the resistivity of each formation layer beyond the invaded zone(s) as obtained with the model that matches the measured induction log.

Inverse well logging thus involves forward modelling, wherein an induction log is computed.

There is a further reason why a computed induction log is required, and that is in checking whether a logging tool configuration can be applied in a particular formation.

In order to compute the induction log, one has to solve the Maxwell equations for the electromagnetic field. These equations are given below:

$$\Delta \times \vec{E} + \partial \vec{B}/\partial t = 0,$$

$$\Delta \cdot \vec{D} = q, \ \Delta \times \vec{H} - \partial \vec{D}/\partial t = \vec{J}, \ \Delta \cdot \vec{B} = 0.$$

In the above equations, $\vec{E}$ is the electric field strength (volt/meter), $\vec{B}$ is the magnetic flux density or magnetic induction (tesla, or weber/square meter), t is time (second), $\vec{D}$ is electric flux density (coulomb/square meter), $\vec{H}$ is the magnetic field strength (ampere/meter), q is volume charge density (coulomb/cubic meter) and $\vec{J}$ is the current density (ampere/square meter).

The vector products are defined in Cartesian coordinates as follows:

$$\nabla \times \vec{v} = \vec{i}_1 \left( \frac{\partial v_3}{\partial x_2} - \frac{\partial v_2}{\partial x_3} \right) + \vec{i}_2 \left( \frac{\partial v_1}{\partial x_3} - \frac{\partial v_3}{\partial x_1} \right) + \vec{i}_3 \left( \frac{\partial v_2}{\partial x_1} - \frac{\partial v_1}{\partial x_2} \right) \text{ and}$$

$$\nabla \cdot \vec{v} = \frac{\partial v_1}{\partial x_1} + \frac{\partial v_2}{\partial x_2} + \frac{\partial v_3}{\partial x_3}.$$

For a medium having linear isotropic electromagnetic properties and where there are no sources the following constitutive relations are assumed:

$$\vec{B} = \mu \vec{H}, \ \vec{D} = \epsilon \vec{E} \text{ and } \vec{J} = \vec{E}/\rho,$$

wherein $\mu$ is the magnetic permeability (henry/meter), $\epsilon$ is the dielectric constant (farad/meter) and $\rho$ is the resistivity (ohm.meter).

These equations have to be solved for an induction logging tool with known properties positioned in a wellbore that extends through a layered formation that is invaded by wellbore fluid. Furthermore, the wellbore can be a deviated one.

For such a problem, there is no exact solution of the Maxwell equations in three dimensions. Numerical solutions require the use of finite difference methods or finite element methods, both methods require a large amount of computing power and time.

However, exact solutions of the Maxwell equations are known for one-dimensional models. In one dimension, there are two models: (1) a one-dimensional concentric cylinder model, which takes into account the wellbore, the invasion and the true formation resistivity, but which does not take into account the effects of the formation layering and of the orientation of the logging tool with respect to the formation layering e.g. due to a deviated wellbore, and (2) a one-dimensional layered model, which takes into account the effects of the formation layering and of the orientation of the logging tool with respect to the formation layering.

An example of the first model is described in the article "General formulation of the induction logging problem for concentric layers about the borehole", J R Wait, IEEE Transactions on Geoscience and Remote Sensing, Vol. GE-22, No. 1, January 1984, pages 34–42. Examples of the solutions for the second model are described in the articles "Theory of induction sonde in dipping beds", R H Hardman, L C Shen, Geophysics, Vol. 51, No. 3, March 1986, pages 800–809 and "The response of an induction dipmeter and standard induction tools to dipping beds", S Gianzero, S-M Su, Geophysics, Vol. 55, No. 9, September 1990, pages 1128–1140.

In the one-dimensional concentric cylinder model, it is assumed that the wellbore is positioned in an infinitely thick layer comprising two or more concentric zones, which concentric zones are concentric with the wellbore. The interface between two concentric zones corresponds to the depth of invasion of the wellbore fluid. The interfaces between the concentric zones are generally assumed to be parallel to the wellbore wall. In this model the effects of the formation layering and of the orientation of the logging tool with respect to the formation layering are not taken into account.

In the one-dimensional layered model the formation layers are considered to be homogeneous layers and the position and orientation of the induction logging tool with respect to the formation layering is correctly taken into account. In one approach, the deviated wellbore is replaced by a line, which is subjected to a transformation to arrive at an imaginary wellbore that is perpendicular to the formation layering. The solution is then transformed such that it is the solution for the deviated wellbore. The one-dimensional layered model does not take into account the effect of invasion of wellbore fluid in the formation.

SUMMARY OF THE INVENTION

It is an object of the present invention to combine the two one-dimensional models so as to be able to calculate an approximate solution of the Maxwell equations that requires less computing power and time than a solution of a three-dimensional model.

To this end the method of providing a computed induction log for an induction logging tool run through an interval of a wellbore that extends through a layered formation which formation is invaded by wellbore fluid, according to the invention comprises the steps of:

(1) computing a first response of the induction logging tool by solving for each formation layer the Maxwell equations for the electromagnetic field with known logging tool properties, wellbore diameter, wellbore fluid resistivity, diameter of the invaded zone, and resistivity of the invaded zone and of the formation layer outside the invaded zone, using a one-dimensional concentric cylinder model not taking into account the effects of formation layering and of the orientation of the logging tool with respect to the formation layering, and determining for each formation layer an equivalent resistivity that gives for a homogeneous environment a response of the induction logging tool that equals the first response; and (2) computing for a number of logging points solutions of the Maxwell equations for the electromagnetic field with the known logging tool properties and the equivalent resistivities for the formation layers, using a one-dimensional layered model wherein the effects of the formation layering and of the orientation of the logging tool with respect to the formation layering are taken into account, to provide the computed induction log of the induction logging tool.

In an alternative embodiment, the method of providing a computed resistivity for an induction logging tool at a logging point in an interval of a wellbore that extends through a layered formation which formation is invaded by wellbore fluid, according to the invention comprises the steps of:

(1) defining in each formation layer a plurality of concentric zones, wherein the first concentric zone is the wellbore, wherein the diameters of the next concentric zones correspond to the diameters of the invaded zones of the formation layers within the interval of the wellbore, and wherein the last concentric zone is outside the invaded zone with the largest diameter;

(2) computing for the logging point, for each concentric zone a first response of the induction logging tool by solving the Maxwell equations for the electromagnetic field with the known logging tool properties, using a one-dimensional layered model wherein the effects of the formation layering and of the orientation of the logging tool with respect to the formation layering are taken into account, and wherein the resistivity of each formation layer equals the resistivity of the concentric zone of that formation layer, and determining for each concentric zone an equivalent resistivity which gives for a homogeneous formation a response of the induction logging tool that equals the first response; and (3) computing solutions of the Maxwell equations for the electromagnetic field with known logging tool properties and the diameters and the equivalent resistivities of the concentric zones, using a one-dimensional concentric cylinder model not taking into account the effects of formation layering and of the orientation of the logging tool with respect to the formation layering to provide the computed resistivity for the induction logging tool at the logging point.

BRIEF DESCRIPTION OF THE DRAWINGS

FIG. 2b shows schematically the equivalent representation of the formation layer shown in FIG. 2a.

DETAILED DESCRIPTION

The logging tool properties include: the number of transmitter coils and their number of turns; the number of receiver coils and their number of turns; the position of each coil on the logging tool; the frequency of the transmitted signal; and the type of mandrel, electrically conductive (used in tools operating at high frequencies in the MHz-range) or electrically non-conductive (used in tools operating at moderate frequencies in the kHz range). The configuration of the coils of the logging tool determines the radial depth of investigation of the induction logging tool, that is the radius of the zone around the wellbore that contains the material whose properties dominate the measurements.

The invention will now be described by way of example in more detail with reference to the accompanying Figures.

Figure 1:
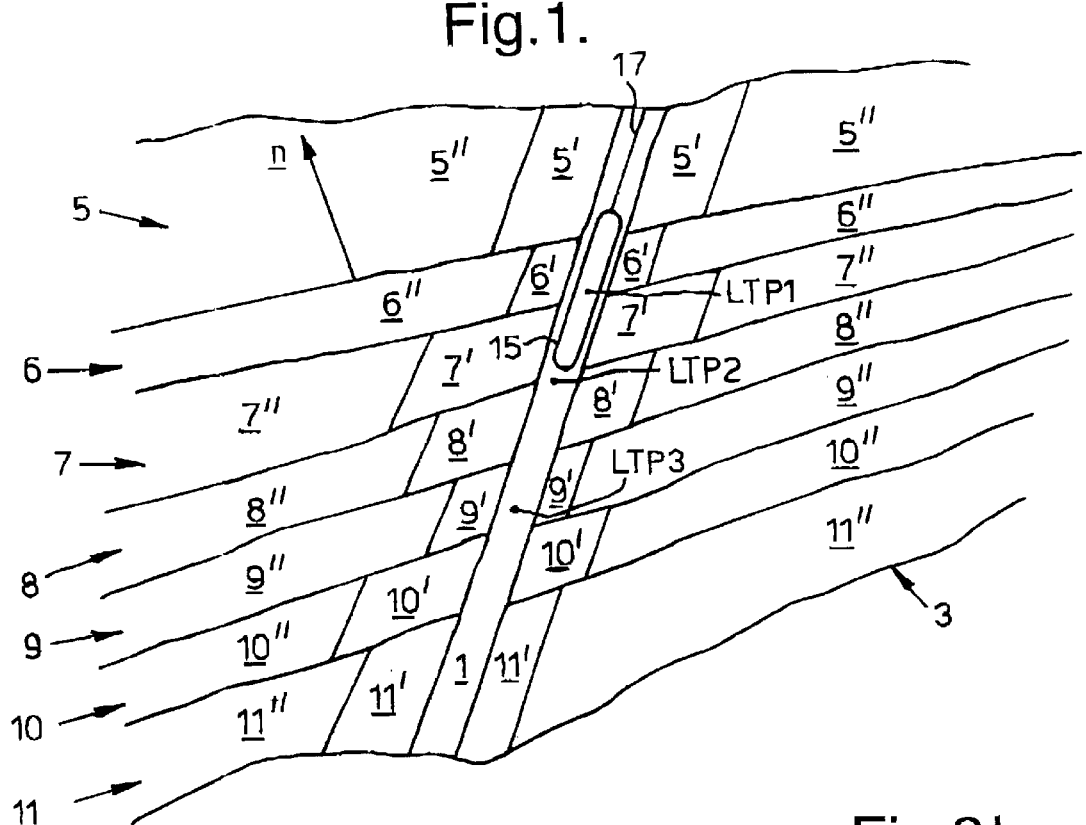
FIG. 1 shows schematically an interval of a wellbore extending through a layered formation.

Reference is now made to FIG. 1 showing a wellbore 1 extending through a layered formation 3, which wellbore is filled with wellbore fluid. The layered formation comprises a plurality of layers 5, 6, 7, 8, 9, 10 and 11. The layered formation is invaded by wellbore fluid, and thus the formation layers include an invaded zone and an undisturbed zone outside the invaded zone. The invaded zones are referred to with the reference numerals 5', . . . , 11' and the undisturbed zones with 5", . . . , 11".

A wireline induction logging tool 15 is positioned in the wellbore 1, which induction logging tool 15 is suspended from an armoured communication cable 17. The induction logging tool 15 is provided with at least one transmitter coil (not shown) and at least one receiver coil (not shown) located axially spaced apart from the transmitter coil. The induction logging tool 15 is situated co-axially with the wellbore 1. The orientation of the central longitudinal axis of the induction logging tool 15 with respect to the formation layering can be defined as follows. If a unit vector n normal to the formation layers 5, . . . , 11 is projected into an orthogonal axis system (not shown) attached to the induction logging tool 15, the unit vector n can be specified by the dip angle $\alpha$ and the azimuth angle $\beta$.

The present invention provides a method of providing a computed induction log of the induction logging tool 15 run through the interval of the wellbore 1. A first embodiment of the invention will now be described.

Figure 2A:
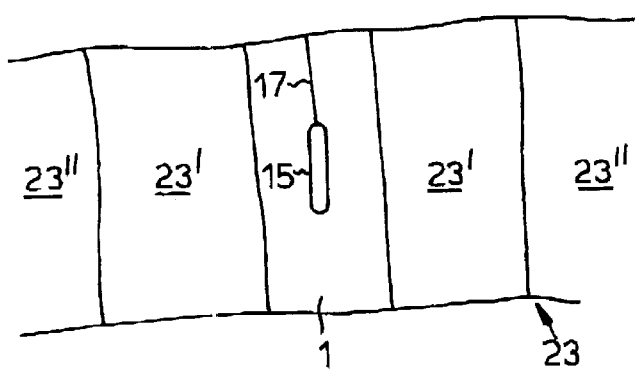
FIG. 2a shows schematically an interval of a formation layer used in a one-dimensional concentric cylinder model.

At first a one-dimensional concentric cylinder model is made of the induction logging tool 15, the wellbore 1 and the formation 3. This model is shown in FIG. 2a, the formation is represented by a formation layer referred to with reference numeral 23, the invaded zone with reference numeral 23' and the undisturbed zone with 23". The formation layer 23 is now arranged in a direction perpendicular to the wellbore 1, and the formation layer 23 extends infinitely in the axial direction of the wellbore 1. This model of the induction logging tool, wellbore and formation is a one-dimensional concentric cylinder model not taking into account the effects of formation layering and of the orientation of the logging tool 15 with respect to the formation layering.

With this model a first response of the induction logging tool 15 is computed by solving for each formation layer 5, . . . , 11 (of FIG. 1) the Maxwell equations for the electromagnetic field with known logging tool properties, wellbore diameter, wellbore fluid resistivity, diameter of the invaded zone, and resistivity of the invaded zone and of the formation layer outside the invaded zone. That is to say, the response of the induction logging tool 15 in the wellbore 1 is computed for the formation layer 23 having first the properties of the formation layer 5 (see FIG. 1), then the properties of formation layer 6 and so on until formation layer 11.

Figure 2B:
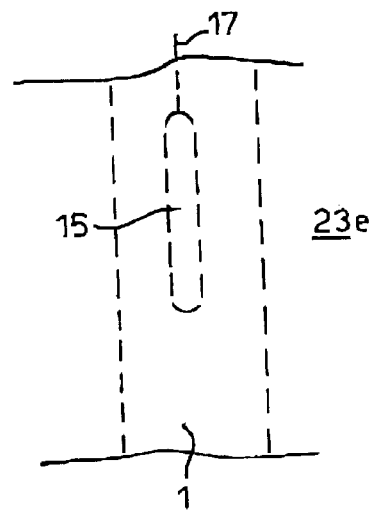

Then for each formation layer 5, . . . , 11 an equivalent resistivity is determined, wherein the equivalent resistivity is the resistivity of a homogeneous environment that gives a response of the induction logging tool 15 equal to the first response. The homogeneous environment includes both the wellbore 1 and the formation layer 5, . . . , 11. In this way, the resistivity of the wellbore fluid in the wellbore 1, the resistivity of the invaded zone 5', . . . , 11' and the resistivity of the formation 5", . . . , 11" outside the invaded zone are replaced by a single equivalent resistivity for each formation layer 5, . . . , 11 including the interval of the wellbore 1 adjacent that formation layer. The equivalent representation of layer 23 is shown in FIG. 2b, in which the layer is referred to by $23_e$. The position of the wellbore 1 and of the logging tool 15 is shown in FIG. 2b with dashed lines.

Figure 3:
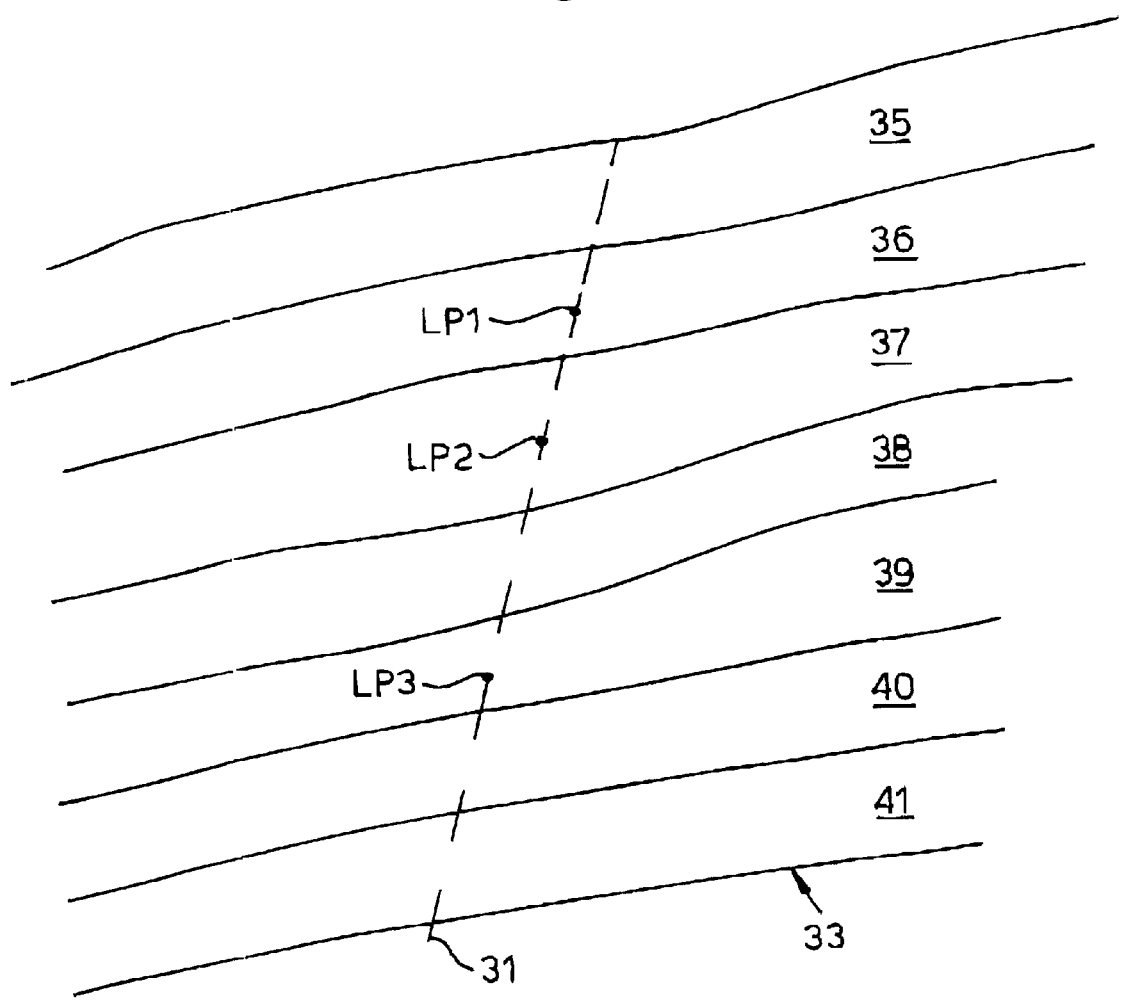
FIG. 3 shows schematically a layered formation used in a one-dimensional layered model.

The next step will be discussed with reference to FIG. 3, showing a model of the layered formation of FIG. 1, wherein the formation 33 comprises homogeneous formation layers 35, . . . , 41 each having the equivalent resistivity that pertains to the formation layer 5, . . . , 11 of FIG. 1 and that is determined in the previous step. Since the homogeneous environment does not include a wellbore, the position of the central longitudinal axis of the wellbore is indicated with dashed line 31. Because the logging tool (not shown in FIG. 3) is situated co-axially with the wellbore, its central longitudinal axis coincides with the dashed line 31. This model is a one-dimensional layered model, wherein the effects of the formation layering and of the orientation of the logging tool with respect to the formation layering are taken into account.

With this model, the Maxwell equations for the electromagnetic field are solved for a number of logging points, LP1, LP2 and LP3 with the known logging tool properties and the equivalent resistivities for the formation layers 35, . . . , 41. The solution obtained in this way provides the computed induction log of the induction logging tool 15 for the logging points LP1, LP2 and LP3.

If more logging points are used, then the computed induction log approaches a continuously sampled one.

Applicant has found that the induction log obtained in this way is a good approximation of the induction log that can be calculated with a three-dimensional model. However, the advantage of the method of the present invention is a considerable saving in computing time.

With a slight modification, the steps discussed with reference to FIGS. 2 and 3 can be reversed, this embodiment of the present invention is particularly suitable when the induction log is to be computed for only a limited number of logging points.

Figure 4:
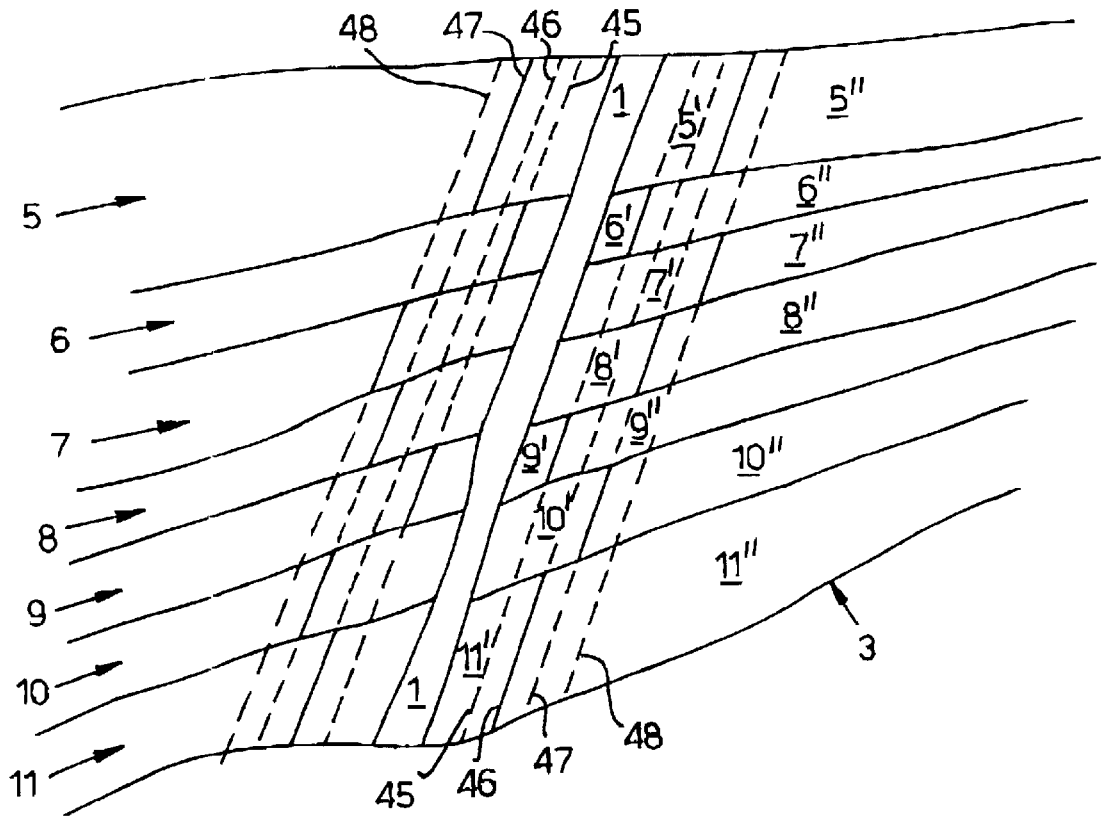
FIG. 4 shows schematically an interval of a wellbore extending through a layered formation.

The formation shown in FIG. 1 is used as a starting point, and the first step will be described with reference to FIG. 4.

The first step of this embodiment comprises defining in each formation layer 5, . . . , 11 a plurality of concentric zones, wherein the first concentric zone is the wellbore 1 and wherein the diameters of the next concentric zones correspond to the diameters of the invaded zones 5', . . . , 11' of the formation layers 5, . . . , 11 within the interval of the wellbore 1. In FIG. 4, the lines 45, 46, 47 and 48 indicate the interfaces between adjacent concentric zones, and the solid line-sections in each line 45, . . . , 48 indicate the interface of the invaded zone 5', . . . , 11' and the undisturbed zone 5", . . . , 11" of the particular formation layer 5, . . . , 11.

The next step will now be discussed with reference to FIG. 3 showing the one-dimensional layered model wherein the effects of the formation layering and of the orientation of the logging tool with respect to the formation layering are taken into account. The induction logging tool is positioned in the logging point LP1, and the formation 33 comprises homogeneous. formation layers 35, ..., 41 each having a particular resistivity. This step comprises a number of computations, wherein the Maxwell equations for the electromagnetic field are solved to obtain a first response with the known logging tool properties, wherein the resistivity of each formation layer 35, ..., 41 equals the resistivity of the concentric zone of that formation layer. After each computation, an equivalent resistivity is determined for each concentric zone which gives for a homogeneous formation a response of the induction logging tool that equals the first response.

Thus, for the first of the computations, the resistivity of each formation layer 35, ..., 41 is set equal to the resistivity of the wellbore fluid in the wellbore 1, and a first response is obtained for the first concentric zone—the wellbore—by solving the Maxwell equations. After this computation, an equivalent resistivity is determined for the first concentric zone which gives for a homogeneous formation a response of the induction logging tool that equals the first response.

Then for the second of the computations, the resistivity of each of the formation layer 35, ..., 41 is set equal to the resistivity of the formation layer 5, ..., 11 (see FIG. 4) in the second concentric zone defined between the wall of the wellbore 1 and the first interface 45, and a first response is obtained for the second concentric zone by solving the Maxwell equations. After this computation, an equivalent resistivity is determined for the second concentric zone which gives for a homogeneous formation a response of the induction logging tool that equals the first response.

Then for the third of the computations, the resistivity of each of the formation layer 35, ..., 41 is set equal to the resistivity of the formation layer 5, ..., 11 (see FIG. 4) in the third concentric zone defined between the wall of the first interface 45 and the second interface 46, and a first response is obtained for the third concentric zone by solving the Maxwell equations. After this computation, an equivalent resistivity is determined for the third concentric zone which gives for a homogeneous formation a response of the induction logging tool that equals the first response.

In this way the equivalent resistivities for the fourth concentric zone—defined by the interfaces 46 and 47, the fifth concentric zone—defined by the interfaces 47 and 48 and the sixth concentric zone—extending into the undisturbed formation from the interface 48 are determined.

Figure 5:
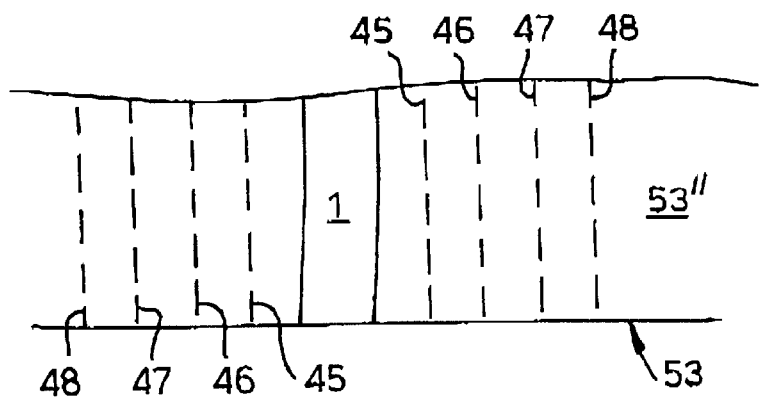
FIG. 5 shows schematically an interval of a formation layer used in a one-dimensional concentric cylinder model.

In order to provide the computed resistivity of the induction logging tool at the logging point LP1, only one more step has to be carried out. This step will be explained with reference to FIG. 5 showing a one-dimensional concentric cylinder model of the formation 3 as shown in FIG. 4, which is represented by a formation layer referred to in FIG. 5 with reference numeral 53. The formation layer 53 is now arranged in a direction perpendicular to the wellbore 1, and the formation layer 53 extends infinitely in the axial direction of the wellbore 1. This model of the induction logging tool, wellbore and formation is a one-dimensional concentric cylinder model not taking into account the effects of formation layering and of the orientation of the logging tool with respect to the formation layering. The resistivity of each of the concentric zones is the corresponding equivalent resistivity determined for the first concentric zone (the wellbore), the second concentric zone and so on.

With this model the Maxwell equations for the electromagnetic field are solved with the known logging tool properties and the diameters and the equivalent resistivities of the concentric zones to provide the computed induction log of the induction logging tool at the logging point LP1.

This second embodiment provides an elegant way to compute the resistivity of the induction logging tool at a particular logging point. When the induction log has to be determined for more logging points, the above described steps have to be repeated for each of the logging points.

The methods of the present invention as explained in the above with reference to the Figures can be used to check whether a logging tool configuration can suitably be applied in a particular formation. However, the methods can as well be used in inverse well logging, wherein an electric resistivity of a layered earth formation surrounding a wellbore filled with a wellbore fluid is determined.

Such a method comprises the steps of
a) operating an induction logging tool in the wellbore so as to provide a set of measured induction logs of the earth formation for different radial depths of investigation;
b) selecting for each layer a modelled resistivity profile, which consists of the wellbore fluid resistivity, the formation dimensions, the diameter and the resistivity of the invaded zone, and the resistivity of the formation layer outside the invaded zone;
c) providing a set of computed induction logs of the induction logging tool;
d) updating the modelled resistivity profile in dependence of an observed deviation of the measured induction logs from the computed induction logs; and
e) repeating steps c) and d) until the difference between the measured induction logs and the computed induction log is below a selected threshold value, wherein providing the computed induction log is done in accordance with one of the methods according to the present invention.

As the computed induction log approaches the measured induction log, the modelled resistivity profile increasingly well resembles the true resistivity profile.

In the above it is assumed that there is only one invaded zone per formation layer, however, the method of the invention can as well be applied when there are two (a flushed and an invaded) or even more than two invaded zones.

The methods according to the present invention involve computations which may be performed by using a data processing system. The data processing system is suitably equipped to run program code, which program code may be loaded into the data processing system such that it can be run. The program code may e.g. have the form of instructions written in a high-level or a low-level programming language which may need to be compiled by the data processing system before they can be run, or the form of compiled instructions which latter form is often referred to as machine code.

The expression "computer program product" will in the description and in the claims be used to refer to a product comprising an embodiment of the program code on a computer readable medium. It will be clear to the person skilled in the art, that there are many forms of computer readable media, including storage media (e.g. CDROM, hard disk, floppy disk, magnetic tape, computer memory) and communication media (e.g. networks, remote file servers, hardwired or wireless data communication lines).

The program code may consist of portions of program code, each of which may be embodied on a separate computer readable medium. The portions of program code may be loaded separately or jointly into the data processing system, and may be run separately or in interaction with each other.

In particular, the program code may include instructions that cause the data processing system to perform calculations so as to solve the Maxwell equations for the electromagnetic field using a one-dimensional concentric cylinder model, or using a one-dimensional layered model. The program code may provide for the possibility to use results obtained from solving the Maxwell equations using one of the models as part of the input for a subsequent step of solving of the Maxwell equations using the other model. The program code may even include all instructions that are necessary to provide, for an induction logging tool, a computed resistivity at one or more logging points or a computed induction log, with or without interaction with an operator of the data processing system in the course of running the program code.

It will be clear that in addition to the program code, input data need to be loaded into the data processing system, which are necessary to characterize the practical situation for which the computations shall be performed. The input data may include known or assumed properties of the logging tool, the wellbore, the wellbore fluid, the invaded zone(s), the formation and/or may include parameters of a physical model.

The invention has been described in relation to wireline logging, however the invention can as well be applied in measuring the formation resistivity during drilling.

We claim:

1. A method of providing a computed induction log for an induction logging tool run through an interval of a wellbore that extends through a layered formation which formation is invaded by wellbore fluid, which method comprises the steps of:
   (a) computing a first response of the induction logging tool by solving for each formation layer the Maxwell equations for the electromagnetic field with known logging tool properties, wellbore diameter, wellbore fluid resistivity, diameter of the invaded zone, and resistivity of the invaded zone and of the formation layer outside the invaded zone, using a one-dimensional concentric cylinder model not taking into account the effects of formation layering and of the orientation of the logging tool with respect to the formation layering, and determining for each formation layer an equivalent resistivity that gives for a homogeneous environment a response of the induction logging tool that equals the first response; and
   (b) computing for a number of logging points solutions of the Maxwell equations for the electromagnetic field with the known logging tool properties and the equivalent resistivities for the formation layers, using a one-dimensional layered model wherein the effects of the formation layering and of the orientation of the logging tool with respect to the formation layering are taken into account, to provide the computed induction log of the induction logging tool.

2. A method of determining an electric resistivity of a layered earth formation surrounding a wellbore filled with a wellbore fluid, which method comprises the steps of:
   a) operating an induction logging tool in the wellbore so as to provide a set of measured induction logs of the earth formation for different radial depths of investigation;
   b) selecting for each layer a modelled resistivity profile, which consists of the wellbore fluid resistivity, the formation dimensions, the diameter and the resistivity of the invaded zone, and the resistivity of the formation layer outside the invaded zone;
   c) providing a set of computed induction logs of the induction logging tool;
   d) updating the modelled resistivity profile in dependence of an observed deviation of the measured induction logs from the computed induction logs; and
   e) repeating steps c) and d) until the difference between the measured induction logs and the computed induction log is below a selected threshold value,
   wherein providing the computed induction log is done in accordance with the method according to claim 1.

3. A method according to claim 1, wherein a data processing system is used for performing the computations.

4. A method according to claim 3, wherein the data processing system runs program code for performing the computations.

5. A method of providing a computed resistivity for an induction logging tool at a logging point in an interval of a wellbore that extends through a layered formation which formation is invaded by wellbore fluid, which method comprises the steps of:
   (a) defining in each formation layer a plurality of concentric zones, wherein the first concentric zone is the wellbore, wherein the diameters of the next concentric zones correspond to the diameters of the invaded zones of the formation layers within the interval of the wellbore, and wherein the last concentric zone is outside the invaded zone with the largest diameter;
   (b) computing for the logging point, for each concentric zone a first response of the induction logging tool by solving the Maxwell equations for the electromagnetic field with the known logging tool properties, using a one-dimensional layered model wherein the effects of the formation layering and of the orientation of the logging tool with respect to the formation layering are taken into account, and wherein the resistivity of each formation layer equals the resistivity of the concentric zone of that formation layer, and determining for each concentric zone an equivalent resistivity which gives for a homogeneous formation a response of the induction logging tool that equals the first response; and
   (c) computing solutions of the Maxwell equations for the electromagnetic field with known logging tool properties and the diameters and the equivalent resistivities of the concentric zones, using a one-dimensional concentric cylinder model not taking into account the effects of formation layering and of the orientation of the logging tool with respect to the formation layering to provide the computed resistivity for the induction logging tool at the logging point.

6. Method according to claim 5, further comprising repeating steps (a) and (b) for each position of the induction logging tool along the interval to provide a computed induction log for the induction logging tool.

7. A method of determining an electric resistivity of a layered earth formation surrounding a wellbore filled with a wellbore fluid, which method comprises the steps of:
   a) operating an induction logging tool in the wellbore so as to provide a set of measured induction logs of the earth formation for different radial depths of investigation;
   b) selecting for each layer a modelled resistivity profile, which consists of the wellbore fluid resistivity, the formation dimensions, the diameter and the resistivity of the invaded zone, and the resistivity of the formation layer outside the invaded zone;

c) providing a set of computed induction logs of the induction logging tool;

d) updating the modelled resistivity profile in dependence of an observed deviation of the measured induction logs from the computed induction logs; and e) repeating steps c) and d) until the difference between the measured induction logs and the computed induction log is below a selected threshold value, wherein providing the computed induction log is done in accordance with the method according to claim 6.

8. A method according to claim 6, wherein a data processing system is used for performing the computations.

9. A method according to claim 8, wherein the data processing system runs program code for performing the computations.

10. A method according to claim 5, wherein a data processing system is used for performing the computations.

11. A method according to claim 10, wherein the data processing system runs program code for performing the computations.

* * * * *

UNITED STATES PATENT AND TRADEMARK OFFICE
CERTIFICATE OF CORRECTION

PATENT NO. : 6,449,561 B1
DATED : September 10, 2002
INVENTOR(S) : Richard Gerrit Hakvoort and Melis van der Horst It is certified that error appears in the above-identified patent and that said Letters Patent is hereby corrected as shown below:

<u>Column 2,</u>
Lines 31-33, please delete

" $\Delta X \vec{E} + \partial \vec{B} / \partial t = 0,$ $\Delta . \vec{D} = q, \Delta X \vec{H} - \partial \vec{D} / \partial t = \vec{J}, \Delta . \vec{B} = 0.$ "

and insert in its place
--
$$\nabla X \vec{E} + \partial \vec{B} / \partial t = 0,$$
$$\nabla . \vec{D} = q,$$
$$\nabla X \vec{H} - \partial \vec{D} / \partial t = \vec{J},$$
$$\nabla . \vec{B} = 0.$$
--

Signed and Sealed this

Eighteenth Day of March, 2003

JAMES E. ROGAN
*Director of the United States Patent and Trademark Office*